US010781751B1

(12) United States Patent
Jones et al.

(10) Patent No.: US 10,781,751 B1
(45) Date of Patent: Sep. 22, 2020

(54) GAS TURBINE ENGINE SECONDARY AIR SYSTEM AND AXIAL THRUST MANAGEMENT SYSTEM FOR A ROTOR OF THE ENGINE

(71) Applicant: Florida Turbine Technologies, Inc., Jupiter, FL (US)

(72) Inventors: Russell B Jones, North Palm Beach, FL (US); Cheryl A Schopf, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 371 days.

(21) Appl. No.: 15/928,500

(22) Filed: Mar. 22, 2018

(51) Int. Cl.
| | | |
|---|---|---|
| *F02C 7/06* | (2006.01) | |
| *F02C 3/08* | (2006.01) | |
| *B64C 39/02* | (2006.01) | |
| *B64D 27/10* | (2006.01) | |

(52) U.S. Cl.
CPC .............. *F02C 7/06* (2013.01); *B64C 39/024* (2013.01); *B64D 27/10* (2013.01); *F02C 3/085* (2013.01); *B64C 2201/048* (2013.01); *F05D 2220/323* (2013.01); *F05D 2240/52* (2013.01); *F05D 2240/54* (2013.01)

(58) Field of Classification Search
CPC .... F02C 7/06; F02C 3/085; F02C 6/08; F02C 3/103; F02C 7/12; B64C 39/024; B64C 2201/048; B64D 27/10; F01D 25/183; F01D 25/22; F01D 25/16; F01D 25/168; F05B 2240/52; F05B 2240/54; F05D 2220/323; F05D 2240/52; F05D 2240/54; F04D 29/051; F04D 29/0516; F04D 29/05; F04D 29/056
See application file for complete search history.

(56) References Cited

U.S. PATENT DOCUMENTS

| | | | | |
|---|---|---|---|---|
| 4,884,942 A | * | 12/1989 | Pennink | F16C 32/0692 415/104 |
| 5,246,352 A | * | 9/1993 | Kawakami | F01D 25/164 384/901 |
| 5,791,868 A | * | 8/1998 | Bosley | F01D 3/04 415/104 |
| 6,367,241 B1 | * | 4/2002 | Ress, Jr. | F01D 3/00 310/90.5 |

(Continued)

*Primary Examiner* — William H Rodriguez
*Assistant Examiner* — Henry Ng
(74) *Attorney, Agent, or Firm* — Koenig IP Works, PLLC; Katherine Koenig

(57) ABSTRACT

A gas turbine engine for an aircraft such as a UAV includes a compressor connected to a turbine with a combustor to produce a hot gas stream. The rotor is supported by two radial foil bearings. An axial thrust bearing assembly is positioned between the compressor disk and the turbine disk and includes an axial thrust bearing radial disk extending from a hollow axial tube. Compressed air is bled off from the compressor and passed into an axial thrust balance chamber to provide the axial thrust balance for the rotor. The compressed air from the thrust bearing chamber then flows through both of the radial foil bearings for cooling, is collected in and around the hollow tube, and then discharged into the inlet of the turbine. An orifice can be adjusted to meter and control a pressure occurring in the thrust balance chamber.

2 Claims, 1 Drawing Sheet

(56) References Cited

U.S. PATENT DOCUMENTS

| | | | | |
|---|---|---|---|---|
| 6,739,845 B2* | 5/2004 | Woollenweber | ........ | F01D 15/10 384/448 |
| 8,215,898 B2* | 7/2012 | Nakazeki | ................ | F16C 19/52 415/104 |
| 8,402,771 B2* | 3/2013 | Isomura | .................... | F02O 3/05 415/115 |
| 9,003,793 B2* | 4/2015 | Begin | ................... | F04D 29/057 60/605.3 |
| 10,240,630 B2* | 3/2019 | Kawaai | .................. | F01D 25/16 |
| 10,641,123 B1* | 5/2020 | Narcus | .................. | F01D 15/10 |
| 2003/0079477 A1* | 5/2003 | Liu | ......................... | F01D 5/081 60/782 |
| 2004/0005228 A1* | 1/2004 | Agrawal | ............... | F04D 29/053 417/365 |
| 2004/0200215 A1* | 10/2004 | Woollenweber | ...... | F02B 37/025 60/407 |
| 2006/0153704 A1* | 7/2006 | Elpern | ................... | F01D 25/22 417/407 |
| 2007/0039330 A1* | 2/2007 | Bladon | .................... | F01D 3/04 60/785 |
| 2007/0134106 A1* | 6/2007 | McKeirnan, Jr. | ..... | F16C 25/083 417/407 |
| 2008/0087018 A1* | 4/2008 | Woollenweber | ...... | F16C 19/546 60/605.3 |
| 2008/0136190 A1* | 6/2008 | Lee | .......................... | F02C 3/05 290/52 |
| 2010/0215299 A1* | 8/2010 | Waki | ................... | F16O 33/1085 384/307 |
| 2012/0003081 A1* | 1/2012 | Woollenweber | .......... | F02O 6/12 415/180 |
| 2012/0111024 A1* | 5/2012 | Kachinski | ............... | F01D 25/16 60/805 |
| 2013/0174574 A1* | 7/2013 | Heaton | .................... | F02O 7/28 60/785 |
| 2013/0318797 A1* | 12/2013 | Royal | .................. | F04D 17/122 29/898.041 |
| 2014/0140817 A1* | 5/2014 | Kim | ........................ | F01D 25/16 415/122.1 |
| 2015/0056071 A1* | 2/2015 | Woollenweber | ...... | F01D 25/125 415/229 |
| 2019/0003335 A1* | 1/2019 | Evans | .................. | F01D 25/125 |
| 2019/0085768 A1* | 3/2019 | Ikeya | ........................ | F02O 7/06 |

* cited by examiner

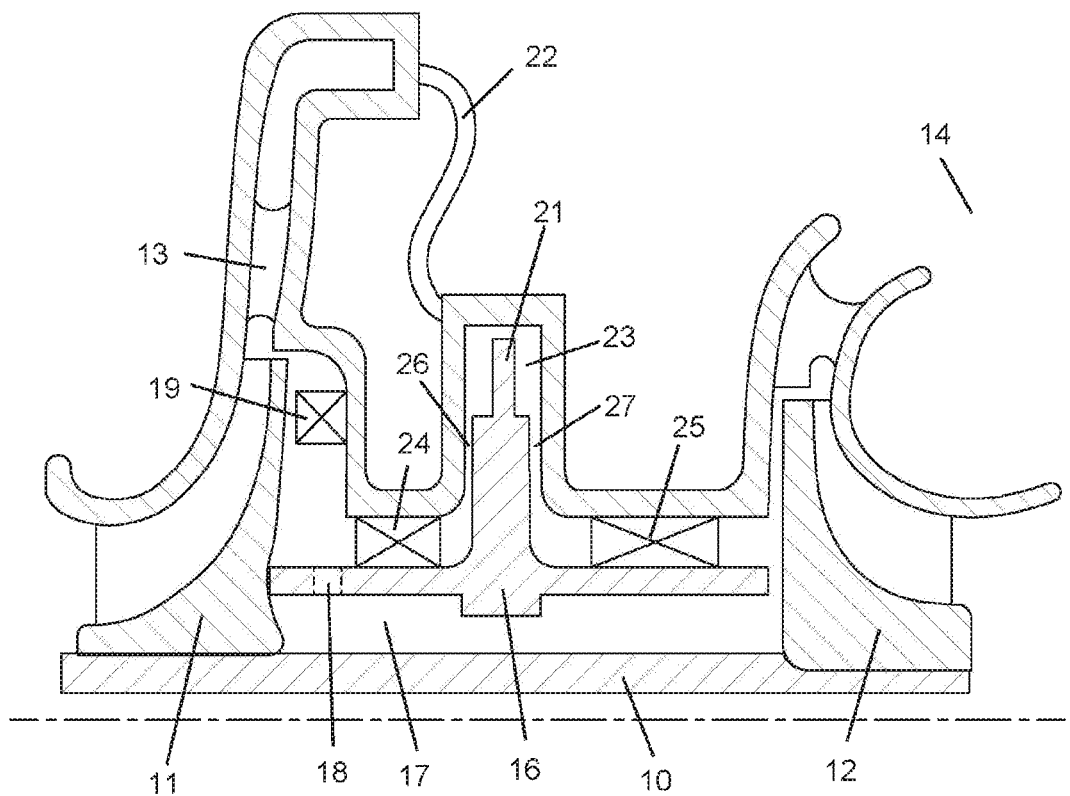

GAS TURBINE ENGINE SECONDARY AIR SYSTEM AND AXIAL THRUST MANAGEMENT SYSTEM FOR A ROTOR OF THE ENGINE

GOVERNMENT LICENSE RIGHTS

This invention was made with U.S. Government support under contract number FA8650-14-D-2400-FA8650-17-F-2707 awarded by the U.S. Air Force Research Laboratory. The U.S. Government has certain rights in the invention.

CROSS-REFERENCE TO RELATED APPLICATIONS

None.

BACKGROUND OF THE INVENTION

Field of the Invention

The present invention relates generally to a small gas turbine engine to power a small aircraft such as a UAV, and more specifically to an axial thrust bearing assembly for a small gas turbine engine.

Description of the Related Art Including Information Disclosed Under 37 CFR 1.97 and 1.98

Small gas turbine engines are being used to provide power for a small aircraft such as an Unmanned Aero Vehicle or UAV. A small gas turbine engine is used to drive an electric generator to produce electrical power that is then used to drive fans that propel and steer the UAV. For a UAV that requires long loiter times, critical features of the power plant include low weight, low volume, and reliability. If the power plant has a minimum weight, then more fuel can be carried and thus longer hover times. The same with a low volume engine. Less space is required for the power plant, and therefore more fuel can be carried. Reliability is critical in that the power plant must be capable of sustaining the mission.

BRIEF SUMMARY OF THE INVENTION

A power plant for an aircraft such as a UAV with a gas turbine engine that drives an electric generator to produce electrical power. A compressor is rotatably connected to a turbine of the engine. The compressor supplies compressed air to a combustor of the engine which burns a fuel to produce a hot gas flow that is directed through the turbine to drive the compressor. An axial thrust bearing assembly is positioned between the compressor and the turbine to provide axial thrust management for the rotor of the engine. Compressed air from the compressor is bled off and delivered to a thrust bearing chamber of the axial thrust bearing which includes a thrust bearing disk. Compressed air flows around both sides of the thrust bearing disk, flows through two foil bearings used to support the rotor in a radial direction for cooling, is collected and then flows into an inlet of the gas turbine of the engine. The axial thrust bearing assembly of the present invention can also be used for turbo-alternator applications.

BRIEF DESCRIPTION OF THE SEVERAL VIEWS OF THE DRAWINGS

FIG. 1 shows a cross section of a small gas turbine engine with an axial thrust bearing disk positioned between a compressor and a turbine of the present invention.

DETAILED DESCRIPTION OF THE INVENTION

The present invention is a small gas turbine engine that drives an electric generator to produce electrical power for an aircraft such as for propelling and steering a UAV or Unmanned Aero Vehicle. An axial thrust bearing assembly is positioned between the compressor and the turbine of the engine to provide for thrust balancing of the rotor. Compressed air from the compressor is bled off and discharged into a thrust bearing chamber to axial position the thrust bearing disk which is secured to the rotor of the engine and thus axial position the rotor. The compressed air used for the thrust bearing disk is collected and delivered to an inlet of the gas turbine to be passed into the gas turbine along with the hot gas flow from the combustor. The axial thrust bearing assembly of the present invention can also be used for turbo-alternator applications.

FIG. 1 shows a cross section of the axial thrust bearing assembly of the present invention. A centrifugal compressor 11 is rotatably connected to a turbine 12 of the engine through a rotor or shaft 10. Compressed air from the compressor 11 passes through a channel with a diffuser 13 and then into a connector that will pass the compressed air through a tube (not shown) to the combustor through a recuperator (not shown). Some of the compressed air is bled off through an orifice used to meter and control a compressed air flow to the thrust bearing assembly through a connector tube 22 in order to tune the thrust bearing design. The compressed air from the connector tube 22 is discharged into a thrust bearing chamber 23 formed around the knife-edge seal of the thrust bearing assembly.

The thrust bearing assembly includes a thrust bearing disk that includes a hollow axial tube 16 and a radial thrust disk extending outward from the hollow axial tube piece. The radial thrust disk includes a narrower thrust runner 21 extending radially outward from a wider radial disk section. A knife-edge seal is formed on the tip of the narrower thrust runner 21 to form a seal across the thrust bearing chamber.

The thrust bearing assembly includes a compressor thrust bearing passage 26 formed between the wider thrust bearing disk and the housing and a turbine thrust bearing passage 27 on the opposite side of the thrust bearing disk 16 formed between the side of the thrust bearing disk and the housing. The compressor thrust bearing passage 26 and the turbine thrust bearing passage 27 are both fixed in their width. Compressed air bled off from the compressor outlet flows from the connector tube 22 and into the two sides of the thrust runner 21 where the compressed air splits up and flows down the sides of the thrust bearing disk of the compressor thrust bearing passage and the turbine thrust bearing passage. An axial thrust from the gas turbine is greater than an axial thrust from the compressor so that the rotor wants to shift toward the gas turbine side. The thrust bearing chamber around the thrust runner 21 will tend to push the rotor toward the compressor side and thus even out the thrust balance. The meter and control bearing orifice at the inlet of the tube 22 can be changed to control the pressure acting to adjust the thrust balance.

The rotor of the engine is rotatably supported by two radial foil bearings 24 and 25. The compressor radial foil bearing 24 is on the compressor side while the turbine radial foil bearing 25 is on the turbine side of the thrust bearing disk. The compressed air that flows into the thrust bearing chamber 23 also flows through the two radial foil bearings 24 and 25 to provide cooling.

The hollow tube of the thrust bearing disk includes one or more holes 18 on a compressor side of the hollow tube to allow for the compressed air from the compressor thrust bearing passage to flow into a rotor cavity 17 formed by the hollow tube. Some leakage flow from the compressor outlet also flows past a seal 19 into a compressor side chamber in which a compressor radial foil bearing 24 is located. The hollow tube rotor cavity 17 has one or more cooling air holes 18 for inlet from the compressor side of the rotor cavity 17 and exit slots on the outlet on the turbine side of the rotor cavity 17. A turbine radial foil bearing 25 is located on the turbine side. Both the compressor radial foil bearing 24 and the turbine radial foil bearing 25 rotatably support the thrust bearing disk.

Compressed air from the knife-edge seal chamber also flows down the turbine thrust bearing passage 26 and through the turbine radial foil bearing 25 where the air flow is merged with the air flow passing through the hollow tube rotor cavity 17 and then discharged into an inlet of the gas turbine disk 12. A hot gas flow from a combustor 14 flows into the gas turbine inlet along with this air flow from both sides of the thrust bearing disk and the compressor outlet leakage. The compressed air bled off from the compressor for use in the axial thrust bearing assembly is also used to cool both the compressor radial foil bearing 24 and the turbine radial foil bearing 25 before being discharged into the turbine 12 inlet.

The metering and control bearing orifice can be adjusted to control a pressure that acts against the thrust runner 21 as well as against the compressor disk and the turbine disk. The thrust bearing passages 26 and 27 have a width that does not change much at all. The thrust balance force developed occurs on the thrust runner 21 and mostly acts to create a restoring force toward the compressor side of the rotor.

We claim the following:

1. A gas turbine engine for an unmanned aero vehicle comprising:
   a compressor rotatably connected to a turbine through a rotor;
   a combustor to receive compressed air from the compressor and produce a hot gas flow to pass through the turbine and drive the compressor;
   an axial thrust balance assembly secured to the rotor and positioned between the compressor and the turbine;
   the axial thrust balance assembly including a thrust balance disk extending from a hollow tube;
   the thrust balance disk including a narrower radial disk section extending from a wider radial disk section;
   an axial thrust balancing chamber formed around the narrower radial disk section;
   a compressed air connection connecting an outlet of the compressor to an inlet of the axial thrust balancing chamber;
   a compressor radial foil bearing on a compressor side of the thrust balance disk;
   a turbine radial foil bearing on a turbine side of the thrust balance disk;
   the hollow tube forming a rotor cavity to pass air from the axial thrust balancing chamber to an inlet of the turbine; and
   compressed air bled off from the compressor passing through the axial thrust balancing chamber to provide axial thrust balance for the rotor and to provide cooling for the compressor radial foil bearing and the turbine radial foil bearing prior to discharge into the inlet of the turbine.

2. The gas turbine engine of claim 1, wherein:
   the hollow tube includes a cooling air inlet hole to pass compressed air from the compressor radial foil bearing to the rotor cavity within the hollow tube.

\* \* \* \* \*